Feb. 19, 1957  E. J. HIRVONEN  2,781,672
BRAKE OR STOP MECHANISM
Original Filed Oct. 7, 1950  2 Sheets-Sheet 1

INVENTOR.
Eric J. Hirvonen
BY
*Chas. R. Fay*
ATTORNEY

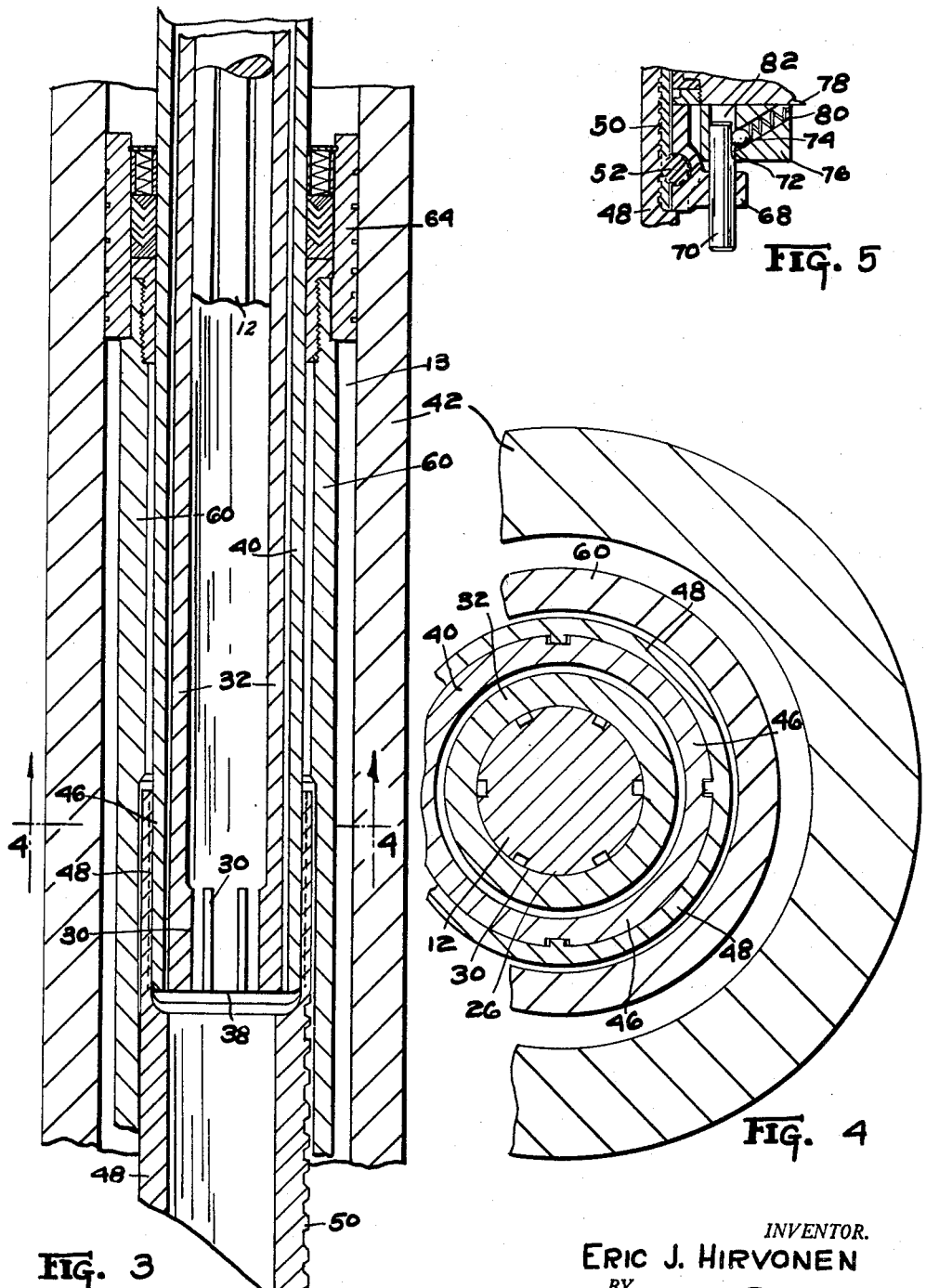

United States Patent Office 2,781,672
Patented Feb. 19, 1957

2,781,672
BRAKE OR STOP MECHANISM

Eric J. Hirvonen, Worcester, Mass., assignor to Leland-Gifford Company, Worcester, Mass., a corporation of Massachusetts Original application October 7, 1950, Serial No. 189,002, now Patent No. 2,647,407, dated August 4, 1953. Divided and this application June 26, 1953, Serial No. 364,381

2 Claims. (Cl. 74—531)

This invention is a division of my prior application Serial No. 189,002 filed October 7, 1950, now Patent No. 2,647,407, and relates in general to new and improved constructions for machine tool spindles and feed means therefor, having particular reference to those spindles which are fed or reciprocated by hydraulic power, and including driven spindles for drill presses.

An object of the invention resides in the provision of a new and improved safety locking means for the spindle, and including a construction whereby the spindle automatically becomes locked at one extreme limit thereof, not usually within the ordinary range of reciprocation; the lock or latching means whereby this result is obtained being such as to require force to overcome, i. e., to unlock the spindle and allow it to again come into action, the locking action being easy and requiring little force, the unlocking action being difficult and requiring considerable force.

Other objects and advantages of the invention will appear hereinafter.

Reference is to be had to the accompanying drawings, in which

Fig. 3 is an enlarged partial view in vertical section;

Fig. 4 is an enlarged section on the line 4—4 of Fig. 3; and

Fig. 5 is a section illustrating the invention.

Figures 1, 2:
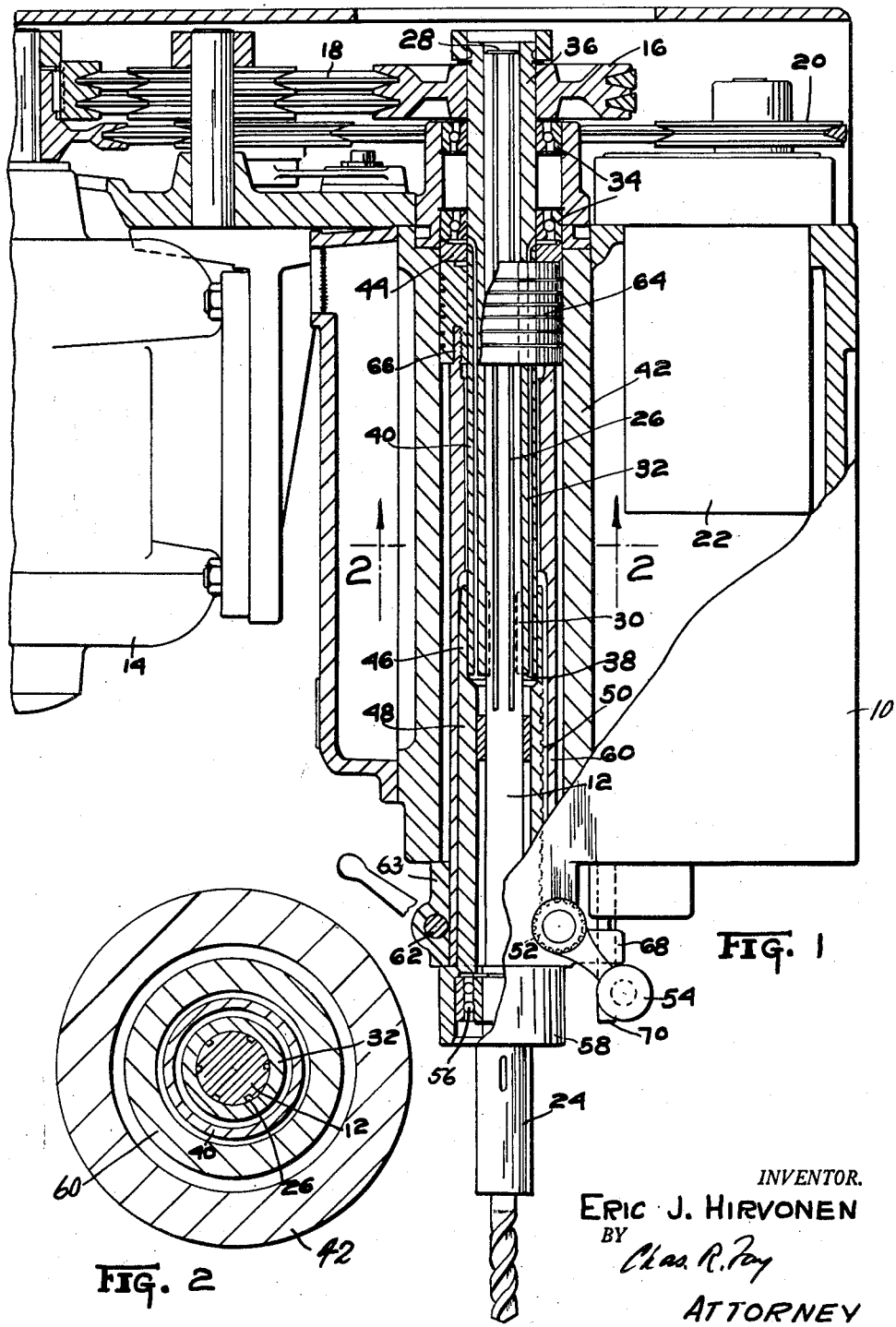
Fig. 1 is a view partly in section through a spindle illustrating the present invention.
Fig. 2 is a sectional view on line 2—2 of Fig. 1.

This invention is herein illustrated as applied to a hydraulic drilling machine but is not limited to such use or to this machine, and the invention is capable of use wherever needed or desired but particularly in the field of machine tool feeds.

A main housing is illustrated in part at 10 and this housing is normally mounted on a standard as will be clear to those skilled in the art. The housing 10 supports all of the mechanism described herein and it is seen that the drill spindle 12 herein as shown vertical, but, of course, it is understood that it may be horizontal or at any angle.

The housing 10 supports a motor 14 for the purpose of rotating the spindle and this motor may be supported in any way desired. Motor 14 drives a pulley 16 through the intermediary of belts 18 in the usual manner. This motor also drives a pulley 20 which is used to operate a pump generally indicated at 22 for providing the hydraulic power required for reciprocating the spindle during its fast travel, feed, reverse, etc. The spindle 12 is elongated and as shown in Fig. 1 it is at its uppermost position, i. e., fully retracted. The spindle 12 has a chuck 24 at its lower end, and the greater length thereof is provided with splines 26 which continue on to the upper end of the spindle indicated at 28.

These splines 26 longitudinally engage complementary interior keyways or the like at 30 in a sleeve 32 which extends upwardly to bearings 34 whereby it is held rotatably but is prevented against axial movement. The sleeve 32 continues upwardly at 36 where it is provided with the pulley 16 so that it is seen the spindle is rotated by the sleeve 32 and yet is axially adjustable in and out or up and down relative thereto. Sleeve 32 terminates at 38 which is the lowermost point thereof.

A sleeve 40 surrounds sleeve 32, the exterior surface of sleeve 40 forming the interior wall of an annular cylinder, the outer wall of which is provided by the inside surface of the relatively large fixed outermost sleeve 42. This cylinder will be described more fully hereinafter.

The sleeve 40 depends from adjacent bearings 34 and is held by a head or stud 44. This sleeve cannot rotate nor can it reciprocate and is held fixed by the member 44. At its lower end, sleeve 40 is provided with exterior splines as at 46 so as to hold non-rotatably but axially sliding thereto a sleeve 48, the latter having a rack 50 for adjustable engagement by a pinion 52 rotatable by a hand crank 54. The sleeve 48 carries the bearing housing or head 58 thereon at the lower end thereof and thus it is seen that the head is adjustable for the length of splines 46 relative to the driving sleeve 32.

The sleeve 48 is non-rotatable but mounts a bearing rotatably supporting the spindle 12 adjacent the lower portion thereof. The spindle 12 and the bearing housing or head 58 are adjustable with sleeve 48 but relative to an exterior sleeve 60 which, however, reciprocates the spindle, being normally clamped to sleeve 48 by a split collar clamping device 62 on a head 63.

Sleeve 60 is secured to a piston 64 as at 66 and this piston, of course, reciprocates under influence of the hydraulic pump according to a valve and control system not herein illustrated. As clearly shown in Figs. 1 and 3 the cylinder wall is on the interior of sleeve 42 but the cylinder itself is annular and the inner wall is on sleeve 40, the spindle and driving sleeve 32 being contained centrally thereof.

The head 63 is provided with a boss 68 on which is mounted a post 70, said post having a notch 72 cooperating with a ball 74 in a housing 76 and backed up by a spring 78 in a channel 80. Said channel is at a particular angle by means of which the post easily forces the ball 74 reversely in channel 80 on the up stroke of the spindle, but once the ball has been pushed aside and drops back into notch 72, the entire weight of the spindle and associated parts is easily held. This device requires considerable force exerted downwardly, to cause the ball to retract to release the post and become unlocked. In other words, the ball is easily forced backwardly in its channel by an upward thrust of post 70 in the bore 82, but it is not easily thrust back in the channel by a downward thrust once the ball is seated in notch 72.

Having thus described my invention and the advantages thereof, I do not wish to be limited to the details herein disclosed, otherwise than as set forth in the claims, but what I claim is:

1. A reciprocatory member having an advance and a retractive stroke and means to latch the member at the end of the retractive stroke comprising a movable element in a channel at an angle to the line of reciprocation, and means striking the element upon the member reaching the end of the stroke and pushing the element rearwardly in the channel, a recess in the striking means receiving the element while still in the channel, resilient means urging the element towards the recess, the angle of the channel being such as to cause relatively easy reception of the element in the notch but difficult ejection thereof to allow a re-advance stroke of the member.

2. The member of claim 1 wherein the channel inclines outwardly and in the direction of the motion of the member on the retractive stroke.

References Cited in the file of this patent
UNITED STATES PATENTS
2,202,217   Mallony _____ May 28, 1940